Dec. 1, 1925.
R. E. MUDD
1,563,778
NEUTRAL LATCH FOR PLANETARY TRANSMISSIONS
Filed Dec. 8, 1924
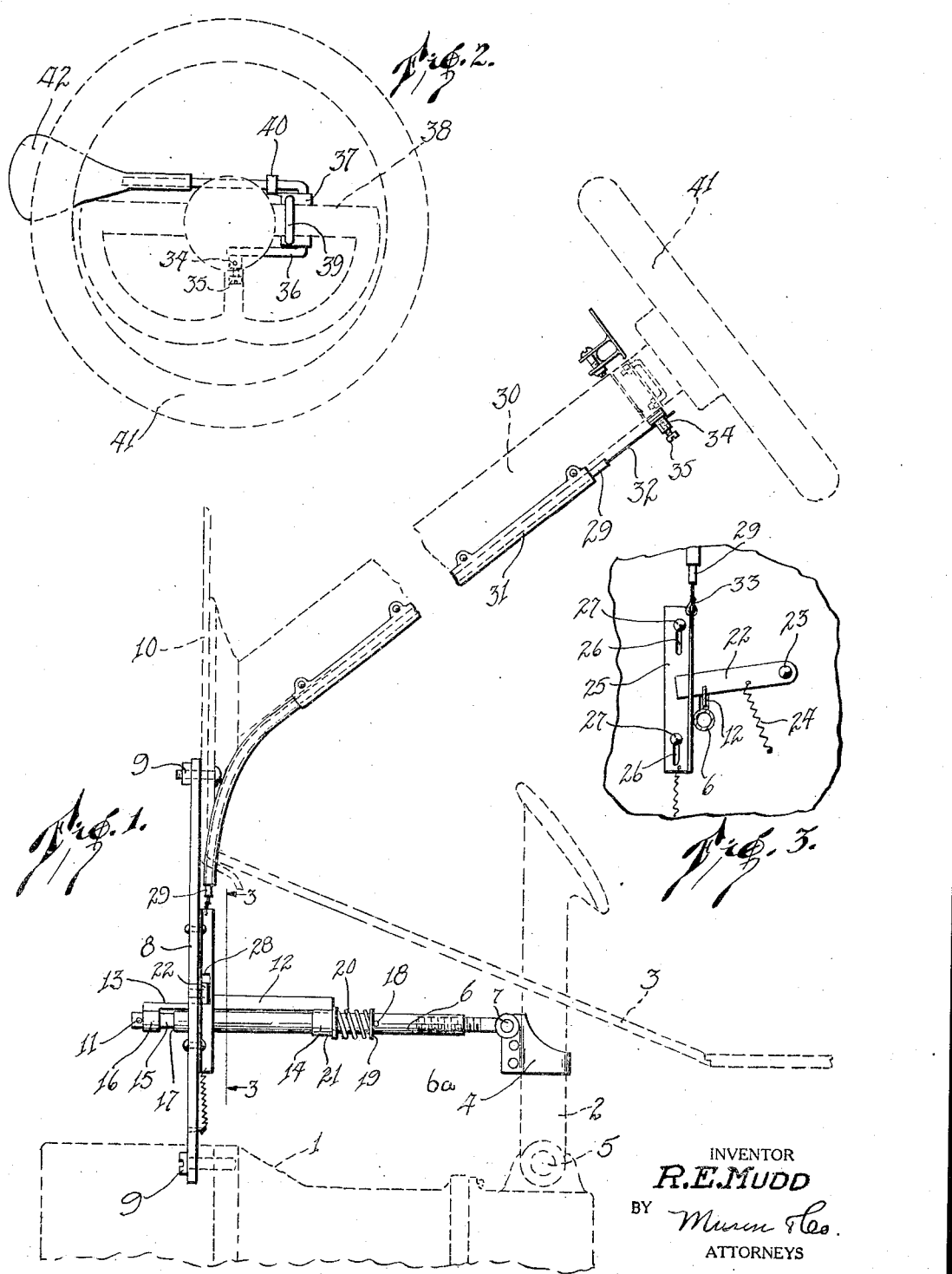
INVENTOR
R.E.MUDD
BY
ATTORNEYS Patented Dec. 1, 1925.

1,563,778

UNITED STATES PATENT OFFICE.

ROLLA E. MUDD, OF CHICAGO, ILLINOIS.

NEUTRAL LATCH FOR PLANETARY TRANSMISSIONS.

Application filed December 8, 1924. Serial No. 754,643.

*To all whom it may concern:*

Be it known that I, ROLLA E. MUDD, a citizen of the United States, and a resident of Chicago, county of Cook, State of Illinois, have invented a new and useful Improvement in Neutral Latches for Planetary Transmissions, of which the following is a full, clear, and exact description.

My invention relates to improvements in neutral latches for planetary transmissions for motor vehicles, particularly of the types which employ a foot pedal for actuating the transmission for low and high speed, and having a neutral position between the low and high speed positions, and it consists in the combinations, constructions, and arrangements herein described and claimed.

An object of my invention is to provide a neutral latch of the type described by means of which unintentional movement of the foot pedal to low speed position, as in moving the pedal to a neutral position while driving, is entirely precluded. It is well known that motor vehicles of the type employing this transmission often undergo serious damage by movement of the actuating pedal inadvertently to low speed position while the vehicle is in motion. A more serious disadvantage, however is found where the driver, with intentions to stop the vehicle, as in an emergency, moves the pedal into position, and continues this movement to low speed position. Obviously, instead of stopping the vehicle, greater power is transmitted to the driving axle, and often serious accidents thus occur.

A further object of my invention is to provide a device of the type described by means of which actuation of the latch is controlled at the point adjacent the peripheral wall of the steering wheel, and which may thus be actuated without removing the hands from the wheel. This construction therefore does not interfere in any way with the normal driving of the vehicle, nor does it place any additional hazard to the driver's full control of the vehicle while in motion.

A further object of my invention is to provide a neutral latch of the type described which may be easily applied to a motor vehicle of the type described without reconstructing any of the parts thereof and without the use of special tools.

A further object of my invention is to provide a device of the type described which readily permits the driver to move the pedal from high speed position to neutral and back at all times, and which prevents movement of the pedal to low speed at all times except when the latch is manually actuated as in the initial movement of the vehicle.

Other objects and advantages will appear in the following specification, and the novel features of the invention will appear in the appended claims.

My invention is illustrated in the accompanying drawings, forming part of this application, in which—

Figure 1 is a side elevation of an embodiment of my invention, adjacent portions of the motor vehicle being shown in dotted lines, Figure 2 is a top plan view of a portion of the mechanism illustrated in Figure 1, and Figure 3 is a sectional view along the line 3—3 of Figure 1.

In carrying out my invention I make use of that type of motor vehicle employing a planetary transmission which is disposed principally within the housing 1 and which has a foot pedal 2 extending through a floor board 3 of the vehicle, which when extending in the position shown in Figure 1 actuates the transmission to engage the engine shaft with the propeller shaft for high speed and which when forced toward the floor board 3 as far as it will normally go, engages the engine shaft with the propeller shaft for low speed and which when at a point intermediate high and low speed positions, wholly disengages the engine shaft from the propeller shaft. This position is referred to as neutral position.

My improved latch consists chiefly of a collar 4 which encompasses the pedal 2 adjacent the fulcrum 5 thereof and to which a tubular member 6 is adjustably connected by means of a threaded rod 6ª pivotally connected at 7 to the collar. The outer end of the rod is in engagement with threads on the inner wall of the adjacent end of the tubular member 6. This construction permits movement of the tubular member 6 toward or away from the collar 4 by rotation of the rod for adjustment, which is usually made prior to the time that the collar is finally fixed to the pedal 2. The tubular member 6 projects through a vertical assembling plate 8 which is secured by the provision of bolts 9 directly to the dash 10 of the vehicle. The bolts 9 are original parts of the vehicle, and serve also to assemble certain other portions substantially as shown.

The tubular member 6 has fixed at its outermost end, beyond the assembly plate 8, a pin 11 which is projected transversely through the rod and which extends radially from either side.

A bolt 12 having a rabbeted portion 13 at its outermost end, and extending substantially a third of the length of the member, is slidably mounted upon the tubular member 6 by means of an integral collar 14 at the inner end of the bolt; i. e., that end toward the pedal 2. The outer end of the bolt 12 is slidably mounted upon a reduced portion 15 of the tubular member 6 by means of an integral collar 16. It will be noted that the pin 11 is projected through the reduced portion 15 of the tubular member 6 and serves to limit the movement of the bolt 12 in one direction while the shoulder 17 of the rod limits movement of the bolt in the opposite direction. A second pin 18 is projected transversely through the tubular member 6 at that end adjacent to the pedal 2 and extends on either side of the rod. A disc 19 encompasses the rod and is held against movement toward the pedal 2 by means of the disc 19. A compression spring 20 is disposed concentric the tubular member 6 betwen the collar 14 and the disc 19. A disc 21 is placed between the collar and the adjacent end of the spring 20.

A latch member 22 is pivotally mounted at 23 to the assembly plate 8. This latch member is provided with a tension spring 24 for normally drawing the latch toward the bolt 12 so that when the bolt 12 is retracted as by movement of the tubular member 6 to the right, as shown in Figure 1, the latch will drop upon the rabbeted portion 13 of the bolt and thus limit the movement of the bolt 12 in the opposite direction when an attempt is made to return the bolt.

Means for actuating the latch 22 is provided in a slide member 25 slidably mounted upon the assembly plate 8 by the provision of slides 26 therethrough and buttons 27 fixed to the plate. The sliding member 25 has an opening 28 therethrough through which the latch member is partially projected.

A tubular member 29 is disposed with one end above the sliding member 25, and the opposite end at a point adjacent to the upper end of the steering column 30 of the vehicle. This tubular member 29 is held in place by a binding cover 31, normally employed to house the horn button wires.

A flexible wire 32 is projected through the tubular member 29 and one end thereof is secured at 33 to the upper end of the sliding member 25. The opposite end of the wire 32 is adjustably secured at 34 by means of a binding screw 35 to the outermost end of the U-shaped throttle rod 36, which is pivotally mounted upon a plate 37. The plate 37 is clamped to the gas quadrant 38 of the vehicle by means of a clamping member 39. The plate 37 has an integral stop member 40 for limiting the movement of the member 36.

While I have here described the member 36 as a U-shaped member, it will be noted that that portion having the binding screw 35 is considerably shorter than the remaining portion, which extends nearly to the rim of the steering wheel 41 of the vehicle.

The outermost end of this portion of the U-shaped member has a hand grip 42 by means of which the U-shaped member may be moved upon its pivotal support 37 and thus lift the sliding member 25 at will to release the latch 22.

From the foregoing description of the various parts of the device, the operation thereof may be readily understood. Let us assume that the driver of a vehicle equipped with my improved neutral latch wishes to start the vehicle which must be done of course by means of the low speed engagement of the engine shaft with the propeller shaft.

This is done by lifting upwardly upon the hand grip 42 while the hand is still upon the steering wheel. This movement of the hand grip will cause the flexible wire 32 to move upwardly through its tubular member 29 and lift the sliding plate 25. When the plate 25 is lifted sufficiently, the latch 22 is moved upon its pivotal support against the action of the spring 24, entirely out of engagement with the bolt 12. Thus the pedal 2 may be forced downwardly until the transmission is so actuated as to engage the engine shaft with the propeller shaft for low speed.

At this time the driver's hand is disengaged from the hand grip 42 and the engine is accelerated, thus causing movement of the vehicle in first speed. When the driver is ready to shift from first to high speed, he releases pressure of his foot from the pedal 2, which moves backwardly, by virtue of the construction of the transmission, which is well known in the art, into high speed position. Movement of the pedal 2 rearwardly causes a like movement of the tubular member 6 with its bolt 12. The latch 22 is free at this time to drop into the rabbeted portion 13 of the bolt 12, because of the pressure exerted by the spring 24.

If now the driver desires to move the pedal 2 to a neutral position, he may do so against the action of the spring 20, since the bolt 12 will remain immovable because of the latch 22. There is sufficient clearance between the discs 19 and 21 when the vehicle is in high speed position to permit movement of the pedal 2 to neutral. Thus it is impossible for the driver through negligence to move the pedal to low speed position when neutral position is desired.

If now the driver wishes to move the pedal into low speed he must lift upwardly on the hand grip 42 and clear the latch 22 of the bolt 12. Thus the pedal may be moved to low speed position.

I claim:

1. The combination with a motor vehicle having a transmission and a pedal for actuating said transmission in low speed, neutral and high speed positions, of a bolt associated with said pedal, a latch, means for normally drawing said latch in engagement with said bolt, whereby said pedal is locked against movement to low speed position, and manually actuated means for releasing said latch, whereby said pedal may be moved to low speed position at will, said bolt being movable with respect to said pedal, whereby said pedal may be moved from high speed to neutral position at all times.

2. The combination with a motor vehicle having a transmission, a pedal for actuating said transmission in low speed, neutral and high speed positions, a tubular member pivotally attached to said pedal, a bolt associated with said tubular member and adapted for limited movement relative to said tubular member, a spring for yieldingly maintaining said bolt in an extended position relative to said tubular member, a latch, means for normally drawing said latch into engagement with said bolt, whereby said pedal is locked against movement to low speed position but may move forwardly against the force of said spring to neutral position, and manually actuated means for releasing said latch, whereby said pedal may be moved to low speed position at will.

ROLLA E. MUDD.